Patented Aug. 25, 1936

2,052,173

UNITED STATES PATENT OFFICE 2,052,173

PAINT CONTAINING CRACKED TAR RESIN

Per K. Frolich, Carl Winning, and Stewart C. Fulton, Elizabeth, N. J., assignors to Standard Oil Development Company, a corporation of Delaware No Drawing. Application March 14, 1932, Serial No. 598,870

16 Claims. (Cl. 134—26)

This invention relates to improvements in the manufacture of paints of the type in which a resin is an essential part of the involatile components. Within recent years this type of paints containing either natural or synthetic resins or both has come into wide use. The solvents ordinarily used for the resins are coal tar hydrocarbons, alcohols, organic oils, and the like. Petroleum hydrocarbon solvents, such as gasoline, have been used as diluents. They have not been generally available as solvents proper because the resins mentioned are not readily soluble in hydrocarbon oil.

According to this invention, paints are prepared from cracked tar resins with or without additional substances as described and indicated below. Such resins are readily soluble in gasoline and other petroleum solvents such as naphtha, kerosene, and the like. By the method to be described it is easy to make paints which are essentially of exclusively petroleum hydrocarbon origin. The inertness and weather-resisting character of these paints fits them for use under rigorous conditions of exposure and corrosive atmospheres.

The cracked tar resins are compounds derived from the residual oil of any method of cracking petroleum or other mineral oils. The residue is a heavy tar which under present conditions has little commercial value. Usually it cannot even be used as fuel oil without special treatment because of the high content of sediment and sediment-forming substances. For most purposes we prefer a truly synthetic resin such as may be obtained from tar from high pressure cracking. In some cases, however, low pressure tars may be used. They are likely to yield low-softening point resins containing some difficultly removable oil.

In U. S. Patent 1,981,824 issued November 20, 1934, to Stewart C. Fulton, and Serial No. 572,059 filed by Stewart C. Fulton on October 30, 1931, and Serial No. 572,060 filed by Stewart C. Fulton and J. Kunc on October 30, 1931, and U. S. Patent 1,926,523 issued to Stewart C. Fulton and V. Kalichevsky on September 12, 1933, processes have been described for obtaining resins from cracked tar, especially synthetic resins of high-softening point resulting from repeated recycling of gas oil. Briefly these processes consist of removing oily asphaltic and unstable resinous constituents from the cracked tar by distillation, preferably under vacuum and by treating and precipitation processes. Agitating or digesting the residual product from distillation with a light petroleum hydrocarbon solvent such as naphtha dissolves the resins therefrom and leaves asphaltenes as residual products. The naphtha solution is then treated with acid or aluminum chloride, neutralized either with finely divided clay or by washing, and distilled to remove the solvent. The residual product upon separation of the naphtha by distillation is a resin having the following properties:

Softening point (ball and
  ring method) _____ 100° F. to 200° F.
Color_____ Light yellow to brown
Streak on porcelain_____ Light yellow to red
Odor_____ None
Taste_____ None Soluble in
  light naphtha, gasoline, etc., linseed oil, China-wood oil, esters such as amyl acetate, benzol.
Insoluble in
  water, lower alcohols, acetone.
Partially compatible with nitrocellulose and other cellulose esters.

The process may also be conducted by treating the original tar straight or diluted with an inert solvent, with aluminum chloride, sulfuric acid, or with aluminum chloride, followed by acid, to throw out asphaltic matter as a sludge and, after separating the sludge, the residual product is distilled, preferably in vacuo, to leave the resin as a bottoms.

The resins obtained are primarily products of cracking and the processes described are employed chiefly for their isolation. Resins, isolated by any other process, which are products of cracking, may be employed with equal facility in the compositions to be discussed. All such resins are referred to hereinafter as "cracked tar resins".

A similar product as described in said applications may be made by taking off a distillate from the cracked tar, condensing the distillate, with or without previous chlorination, with benzol, naphthalene or other aromatic compound in the presence of aluminum chloride. In U. S. application Serial No. 572,060 referred to above, a cracked tar resin is prepared from a petroleum cracking coil tar fraction boiling between 300 and 660° F. Oil, residual chlorine and any chlorine compounds are then removed. A resin produced in this way is similar to that described above but in general has a substantially lighter color than resins formed during the cracking process. Though differing in source from the true cracked tar resins, these synthetic resins will be included under the category "cracked tar resins" in the following disclosures.

It will be understood that the resins referred to may be varied in color by the extent of filtration, washing and chemical treatments employed as described in the applications referred to above. Light color is of course a desideratum when a white or light colored paint is to be prepared. For many purposes, however, the color of the resin itself is suitable and any shade from light yellow through red to black may be made containing the resins as the sole pigment.

As indicated in the table of properties above, the cracked tar resins have a wide range of solubility and any suitable solvent may be used in making up paints or other coating compositions according to this invention. It is preferred, however, to use gasoline or naphtha as the solvent. The following compositions are illustrative:

*Formula I*

| | Parts by weight |
|---|---|
| Light yellow cracked tar resin | 30 |
| Gasoline (boiling range 200° F to 350° F.) | 70 |

When the presence of a drying oil is considered desirable, the following is a good composition:

*Formula II*

| | Parts by weight |
|---|---|
| Light yellow cracked tar resin | 30 |
| Gasoline (boiling range 200° F. to 350° F.) | 60 |
| Boiled linseed oil | 10 |

Instead of linseed oil, any of the other drying oils such as China-wood oil may be used. Readily oxidizable oil polymers formed from derivatives of hydrocarbon oils or gases also come within this class.

The solvent and pigment base of the above formulae may be colored as desired either by materials soluble in the resin solvent, or by a suspension of finely divided, insoluble colors such as Venetian reds, yellow ochre, burnt sienna, ultramarine, etc. White paints may be prepared by using zinc oxide, barium sulphate, lithopone, and the like. A small amount of color in the lighter colored resins can be masked by the white pigments.

The various other adjuncts common in paint manufacture may of course be used, such as plasticizers of the type of dibutyl phthalate, camphor and the like, and driers for example cobalt, lead and manganese compounds. In the class of suitable driers are the heavy metal salts of petroleum sulfonic acids. Waxes such as paraffin and Montan wax may also be incorporated where especially quick drying or cheap paints are desired, the wax rendering the resins non-sticky when only partially dried and rendering them somewhat plastic. The composition given below is particularly suitable for use as a waterproofing paint:

*Formula III*

| | Parts by weight |
|---|---|
| Cracked tar resin | 20 |
| Paraffin wax | 10 |
| Gasoline (boiling range 200° F. to 400° F.) | 70 |

The compositions thus far described are suitable for applying by spray or brush to wood, plaster, metal or other surfaces for indoor or outdoor use. For metal coating, however, it is found that superior results are obtained by using special compositions of the cracked tar resins, gasoline, drying oil and plasticizers. The following is illustrative:

*Formula IV*

| | Parts by weight |
|---|---|
| Dark colored cracked tar resin | 30 |
| Gasoline (boiling range 200° F. to 350° F.) | 55–59 |
| Linseed oil | 10 |
| Petroleum oil soluble sulfonic acid or soap | 1–5 |

In this composition the petroleum sulfonic acid is a so-called "polar compound" which appears to have the property of increasing adhesion between the metal surface and the paint. This type of composition may be applied as a true paint, or may be emulsified with water and distributed in this form especially on extended surfaces which require only a rough coat such as tin roofs. The petroleum sulfonic acid serves as the emulsifier but other compounds having this property may be used with or without the sulfonic acid, for example various metallic soaps of fatty or naphthenic acids.

Where a paint especially resistant to attack by marine organisms or fungi or suitable for imparting such resistance to the materials to which it is applied is desired, copper, mercury or other suitably poisonous salts of the sulfonic acids may be incorporated in the paint. Other fungicides and related materials known to the industry may also be employed.

Another desirable composition is as follows:

*Formula V*

| | |
|---|---|
| Cracked tar resins | 80%–99% by weight |
| Vapor phase gasoline polymers | 20%–1% by weight |
| Kerosene distillate (Varnolene) (boiling range 300° F.–400° F.) | Sufficient to thin the product to the desired consistency |

The vapor phase gasoline polymers are obtained in the known manner by condensing cracked gasoline high in olefines or di-olefines of such gasoline with the aid of aluminum chloride. This composition may be pigmented or otherwise treated as indicated above and is suitable for general use as a paint.

The resins may also be employed in the manufacture of lacquers, varnishes and the like in conjunction with cellulose nitrate or other cellulose esters and ethers. The following is illustrative of a balanced composition:

*Formula VI*

| | Parts by weight |
|---|---|
| Light colored cracked tar resin | 10 |
| Xylene | 40 |
| Plasticizer, linseed oil | 5 |
| Cellulose nitrate | 10 |
| Amyl acetate | 40 |

In the above composition, cracked tar resin is used to replace wholly or partially the resins ordinarily used. It is especially adapted to wood and lithographic lacquers where durable golden or brown color is desired.

Another desirable composition of a varnish is as follows:

Formula VII

| | Parts by weight |
|---|---|
| Light colored cracked tar resin | 50 |
| Linseed oil | 50 |
| China-wood oil | 100 |
| Concentrated liquid drier (Pb, Co or MN) | 27 |
| Kerosene distillate (Varsol) | 173 |

The light colored cracked tar resin, linseed oil and China-wood oil are incorporated by heating to a temperature of about 520° to 535° F. for 45 minutes or until the proper thickening has been obtained. The concentrated liquid drier and kerosene distillate are then added. This composition is suitable to be used in varnish stains or lithographic varnish where a permanent color is desired.

If the fluidity of the resin paints is too great, they may be thickened, preferably by addition of small amounts of soaps, usually less than 1% by weight of the composition. These soaps are ordinarily selected from the class containing aluminum, cadmium, cobalt and sodium soaps of oleic, stearic or other fatty acid or naphthenic acid. Aluminum and cadmium oleate or naphthenate are preferred.

It will be observed that in one process of preparing the cracked tar resins, they are obtained in solution in a hydrocarbon solvent. In cases when the separation of the resins for purification or the like is not required, this solution may be used as such for painting or coating purposes. Since it is ordinarily too dilute, it may be concentrated by evaporating off part of the solvent or thickened by addition of dry cracked tar resins, a concentrate of such resin in a solvent, or other resins or thickening agents. Drying oils and the like may of course also be added directly to this solution. In this way the process is simplified and a product suitable for many purposes is obtained directly.

It will be understood that other resins may be substituted for a portion of the cracked tar resins if desired, but in general we prefer to use them exclusively. The petroleum solvent may range in boiling point from 150° F. to 450° F. The selection of the solvent will be determined by the use which is to be made of the paint.

While the cracked tar resins are generally applicable to the manufacture of the common run of paints, varnishes and enamels, they are of particular interest where special weather resistance is desired. One valuable use for the resin paints described herein is in the coating of sheet roofing, composition shingles, and the like. The resin paints adhere well to materials of this class.

Another use of the improved compositions is in connection with the many metal articles of commerce which are stored and shipped with a removable protective coating. Heretofore vaseline, slushing oil or the like has been commonly used. The greased surfaces so produced are objectionable for handling. By applying a gasoline or other solution of the cracked tar resins to the metal surfaces, they are securely protected from rusting. The coating is dry and non-sticky and may be readily removed by sponging or washing with gasoline or other solvent.

For purposes of metal coating as described, even a gasoline or naphtha solution of the cracked tar itself after removal of the insoluble material may be suitable with or without thickening as described above. Any suitable material may be added to impart additional toughness to the protective film, for example, gasoline polymers, oil-soluble sludge components, fatty acids or the like. Of course the same method may be applied to the coating of articles made of other materials than metal, except those which would absorb the coating material and prevent its complete removal.

The foregoing description is illustrative only and various alternative compositions may be adopted within the scope of the appended claims, in which it is our intention to claim all novelty inherent in the invention as broadly as the prior art permits.

We claim:

1. A coating composition comprising a substantially pure cracked tar resin of petroleum origin and a volatile petroleum hydrocarbon solvent therefor.

2. A paint comprising a volatile petroleum hydrocarbon solution of a substantially pure cracked tar resin of petroleum origin.

3. A paint comprising a substantially pure cracked tar resin of petroleum origin dissolved in a volatile petroleum hydrocarbon solvent.

4. A paint comprising a substantially pure cracked tar resin of petroleum origin, a volatile petroleum hydrocarbon solvent therefor and a pigment.

5. A paint comprising a substantially pure cracked tar resin of petroleum origin, a volatile petroleum hydrocarbon solvent therefor, a pigment and a plasticizer.

6. A paint comprising a substantially pure cracked tar resin of petroleum origin, a volatile petroleum hydrocarbon solvent therefor and a drying oil.

7. A paint comprising a substantially pure cracked tar resin of petroleum origin, a petroleum solvent therefor, a drying oil and a drying agent.

8. A paint comprising a substantially pure cracked tar resin of petroleum origin, a petroleum solvent therefor, a drying oil and a plasticizer.

9. A paint comprising a substantially pure cracked tar resin of petroleum origin, a volatile petroleum hydrocarbon solvent therefor, and less than 1% of a soap having thickening properties.

10. A paint comprising a substantially pure cracked tar resin of petroleum origin dissolved in gasoline having a boiling range between about 150° F. and 450° F.

11. A paint comprising a substantially pure cracked tar resin of petroleum origin, a volatile petroleum hydrocarbon solvent therefor and a cellulose ester or ether.

12. A paint comprising a substantially pure cracked tar resin of petroleum origin, a volatile petroleum hydrocarbon solvent therefor, and a wax.

13. A varnish containing a substantially pure cracked tar resin of petroleum origin, and a drying oil incorporated by means of heat and thinned with a suitable volatile petroleum hydrocarbon solvent.

14. A varnish according to claim 13, in which a drying agent is added.

15. A varnish according to claim 13, in which China-wood oil and linseed oil are incorporated by means of heat.

16. A coating composition comprising a cracked tar resin prepared from a petroleum cracking coil tar fraction boiling between 300 to 660° F., said resin having a ball and ring softening point between 100 and 200° F., and giving a light yellow to red streak on porcelain, and a petroleum hydrocarbon solvent therefor.

PER K. FROLICH.
CARL WINNING.
STEWART C. FULTON.